Nov. 19, 1963    R. I. SATTLER    3,111,326
COLLET CHUCK CONSTRUCTION
Filed May 15, 1961    3 Sheets-Sheet 2
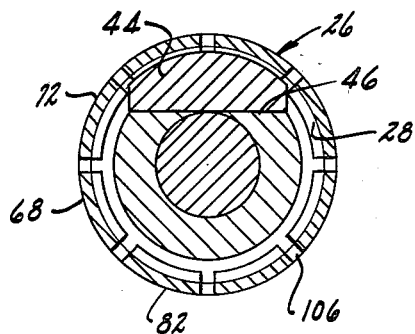
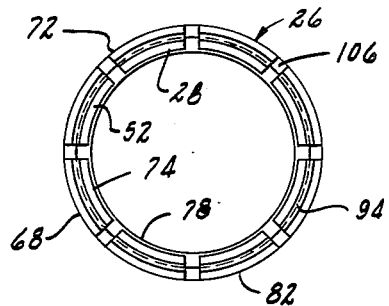
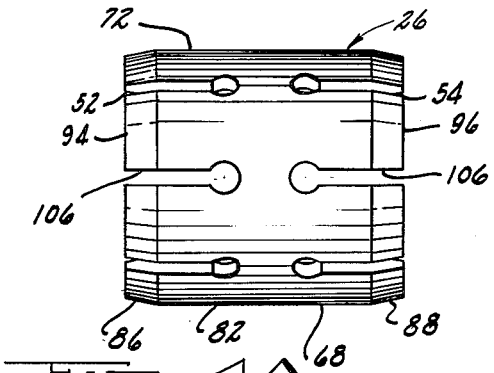
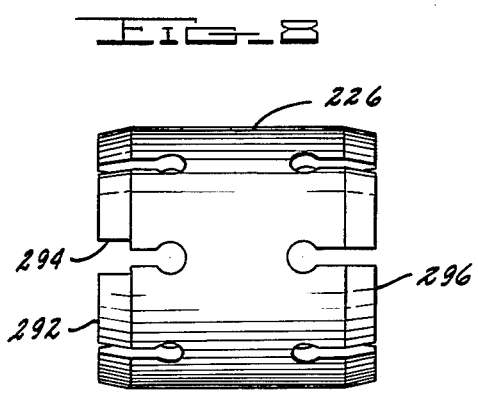
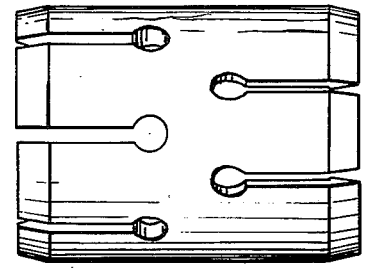
INVENTOR.
ROBERT IRWIN SATTLER Nov. 19, 1963

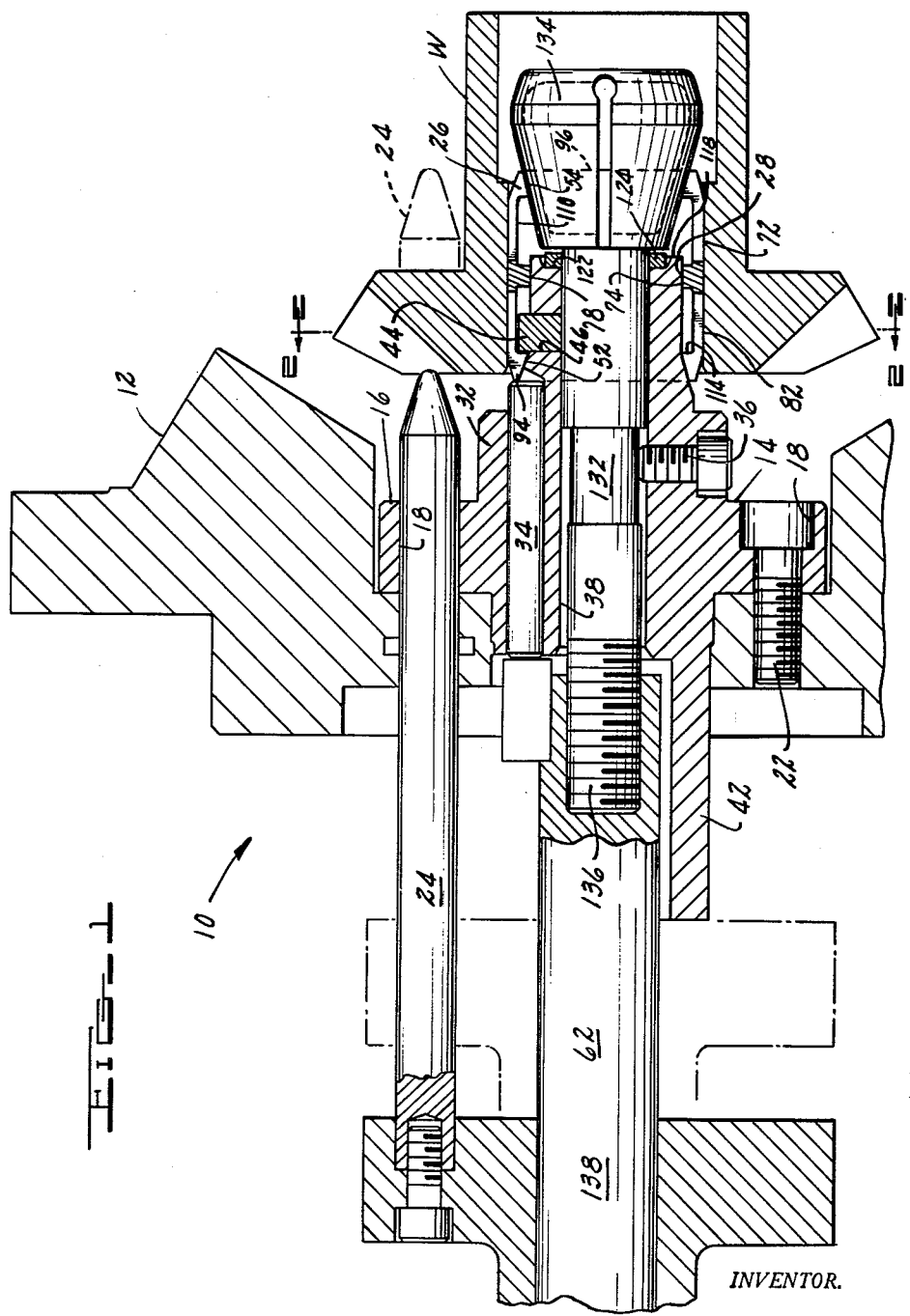

R. I. SATTLER 3,111,326

COLLET CHUCK CONSTRUCTION

Filed May 15, 1961

INVENTOR.
ROBERT IRWIN SATTLER

United States Patent Office 3,111,326
Patented Nov. 19, 1963

3,111,326
COLLET CHUCK CONSTRUCTION
Robert Irwin Sattler, St. Clair Shores, Mich., assignor to LaSalle Machine Tool, Inc., Warren, Mich.
Filed May 15, 1961, Ser. No. 109,904
7 Claims. (Cl. 279—2)

The present invention relates to new and useful improvements in collet constructions and particularly to a collet chuck adapter for use with my collet chuck construction shown in United States Patent No. 2,928,680, dated March 15, 1960.

In the manufacture of various precision machine parts, it is often necessary to perform several machine operations on different machines and in each instance using a previously finished bore or flat finish surface as a locating point. The accuracy of the secondary operations being dependent upon the efficiency of the means used for clamping.

The present invention is adapted for use with an expansible resilient collet construction and is used in the clamping of the inside diameter of a work piece to a machine. It is therefore a primary object of the instant invention to provide a generally cylindrical resilient collet chuck construction with expansible end portions, wherein arbor means are provided to pilot the collet, while stop means are provided to limit the expansive travel of the collet in a manner to engage and securely clamp the inside or outside diameter of a work piece.

Another object of the invention is the provision of a resilient collet chuck having an arbor type adapter which is simple in construction, durable and capable of expanding a collet to engage and securely clamp machine parts accurately and quickly, with a minimum amount of labor.

Still another object of this invention is the provision of a resilient collet chuck which is self centering and operable to expand uniformly at each end or in different amounts.

Additionally, another object of the present invention is the provision of a resilient collet chuck and arbor type adapter which can be used on gages as well as all types of rotating machinery.

The above and other objects can be accomplished by the provision of a collet chuck adapter having an arbor for use with an expansible, resilient, self centering expansible collet chuck, said arbor being generally cylindrical; a hollow, cylindrical resilient collet chuck, slots of equal depth cut into each end thereof, to form a plurality of resilient expansible jaws; a land intermediate the ends of said chuck and on the inside diameter thereof; tapered surfaces on the inside and outside diameter of each end thereof; said cylindrical collet chuck positioned on said arbor and piloted on the land on the inside diameter thereof; stop means on said arbor for limiting displacement of said jaws; and a draw bar having limited displacement, co-axial with said arbor and said collet for expansion of said resilient jaws.

Other objects of this invention will appear in the following description and appended claims, reference being had to the accompanying drawings forming a part of this specification wherein like reference characters designate corresponding parts in the several views.

In the drawings:

FIG. 1 is a cross sectional view through a collet chuck adapter which embodies one form of the present invention.

FIG. 2 is a cross sectional view taken on lines 2—2 of FIG. 1.

FIG. 3 is an end view of the resilient expansible collet shown in FIG. 1.

FIG. 4 is an elevational view of the collet shown in FIG. 3.

FIG. 4A is a modified form of the collet shown in FIG. 4, wherein the slots are not opposed to each other.

FIG. 8 is a modified form of the collet shown in FIG. 4.

Figure 5:
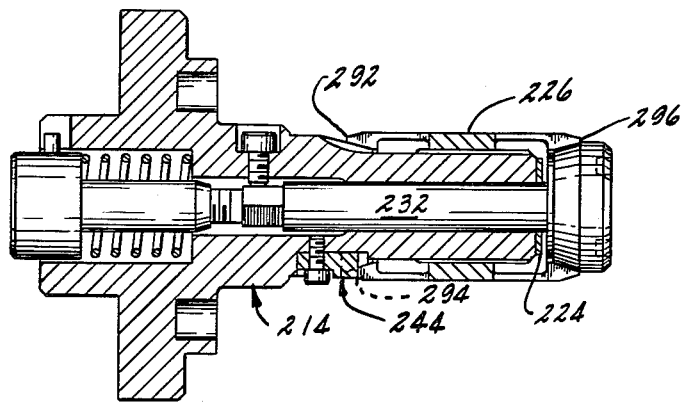
FIG. 5 is a second embodiment of the present invention.
Figure 6:
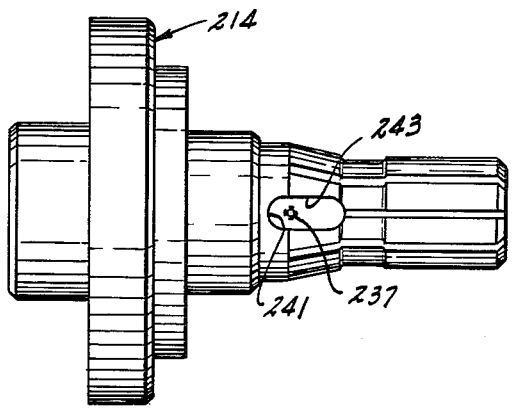
FIG. 6 is an elevational view partially broken away of the arbor shown in the second embodiment illustrated in FIG. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 illustrates a cross sectional view partially in elevation of the first embodiment of the collet chuck adapter assembly 10. In this particular form of the invention, a circular member 12 is positioned about and affixed to a generally hollow arbor 14. Intermediate the ends of the arbor 14 is a flanged portion 16, which is positioned against the circular member 12. A plurality of axially displaced aligned openings 18 are located in the flange 16, several of which receive threaded members 22 for securing the arbor 14 to the circular member 12. At least one of the openings is adapted to receive a knock-out pin 24 which is positioned in parallel relationship to the arbor axis. In actual practice, several knock-out pins are used so as to prevent cocking of the machine part on the collet 26 during the removal of the part. The hub 32 of the generally hollow arbor 14 has positioned in parallel relationship to the axis thereof, one or more spacer members 34, while diametrically opposite the spacer 34 is a radial threaded opening 36 intersecting the inside diameter 38 of the arbor. The left end of the arbor has a stop member 42 integral therewith and extending therefrom, while the right end is generally cylindrical, adapted to receive thereover, the cylindrical resilient collet 26.

The resilient collet chuck 26 (FIGS. 3 and 4) is generally cylindrical in shape. The body portion 72 of the collet 26 is of substantially uniform wall thickness. The outside diameter 82 of the body portion 72 is generally parallel with the inside diameter 28 of the cylindrical body 72 and square with both ends 94 and 96. The ends of the collet have chamfered portions 86 and 88 to permit easy and rapid entry of the work pieces.

The inside diameter 28 of the collet has a precision ground bore 78 therein. Tapered cam surfaces 52 and 54 are located on the inside diameter of the collet 26 and at each end thereof. Additionally, each end 94 and 96 of the collet 26 is slotted at 106 to a depth of approximately one third the total length of the cylindrical sleeve 68. The slots 106 are cut the same depth in each end to provide a uniform distribution of forces and substantially equal expansion at both ends.

Each of the slots terminate in a round machine opening which is generally tangent to the central land 74 intermediate the ends 94 and 96 of the collet 26. The land 74 extends approximately one third the total length of the collet 26, although this dimension may be greater or less than this amount, depending on the part to be positioned by the collet. An undercut portion 110 extends from the land 74 to a point slightly short of the tapered cams 52 and 54.

As will be noted from FIG. 2 of the drawings, an arcuate key 44 is positioned in a slot 46 that extends at generally right angles to the axis of the arbor 14 proper. If we now look at FIG. 1, we will note that when the collet chuck assembly is in the free or unclamped positioned, spacer 34 is held out. Therefore, when a work piece "W" is loaded onto the collet 26, the collet cannot be forced back over the tapered cam surface 52. This prevents the collet 26 from expanding to restrict the loading of work pieces "W."

When the collet 26 is unloaded, the movement thereof is restricted by the use of an arcuate key 44. The key 44 acts to limit axial displacement of the collet 26 in the same manner as does the spacer 34 above described. A flat washer 124 of predetermined thickness is then positioned in the recess 122. A cylindrical draw bar 132 having an enlarged tapered end portion 134 is then inserted through the washer 124 and arbor 14 with the enlarged end 134 positioned immediately adjacent to the washer member. The left end 136 of the rdaw bar 132 is threaded and is secured to a rotatable shaft 138 which is adapted to extend through the central opening on the axis of rotation of a machine tool. Therefore, as the shaft 138 is rotated, the tapered end 134 on the draw bar is drawn into contact with the flat washer 124 thereby limiting displacement of the cam portion 54 on end 96 of the collet 26. By this construction, automatic loading and unloading is made practical on close tolerance parts.

Figure 7:
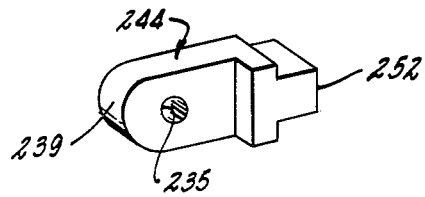
FIG. 7 is a perspective view of the locator clip used in the second embodiment.

FIG. 5 illustrates a second embodiment of the invention which is somewhat more simple. In this embodiment, the same general construction is used, however the arbor 214 is recessed on the circumference to receive a locator clip 244 (FIG. 7). The locator clip 244 is adapted to engage a cut out on the end 294 of the collet 226, this prevents relative rotation of the collet 226 with respect to the arbor 214. A predetermined thickness washer 224 is provided on the end of the arbor 214 and operates to limit the retraction of the draw bar 232.

The collet chuck expander head 134 of the present invention is of generally hollow construction. The resulting flexibility from the use of a hollow head 134 permits the chucking of an irregular shaped sleeve without distorting same, so that a concentric diameter can be ground or otherwise machined thereon. This is not possible with the solid type expanders currently in use.

The teachings of the present invention have been applied to a wide variety of tools such as broach and gage fixtures, grinding arbors and miscellaneous other devices used in the industry. The collet chuck is simple and durable and adaptable to all types of machines. The ends of the collet are slotted and expand uniformly while the central portion thereof is solid and is piloted on the arbor. A spacer 34 is provided to limit axial displacement of the various work pieces during the loading of the collet, while a key 44 is provided within the collet to prevent axial displacement during the unload operation. A flexible tapered hollow head 134 is provided to permit maximum collet engagement of irregular sleeves on miscellaneous work pieces without distortion of same. The work pieces are clamped on the extreme ends of the collet, while the central portion of the collet is piloted on the arbor proper, thereby providing maximum stability and accuracy. The clamping action is simple and positive and is accomplished in a minimum amount of time.

Having thus described my invention, I claim:

1. In an arbor for use with an expansible, resilient, self-centering collet chuck and having a generally cylindrical arbor with a flat end; a hollow, cylindrical collet chuck with slots of generally equal depth cut into each end thereof, to form a plurality of expansible work engaging jaws, a land intermediate the ends of said collet chuck and located on the inside diameter thereof; tapered surfaces on the inside and outside diameter of each end of said collet chuck; said cylindrical collet chuck positioned on said arbor and piloted on the land thereof; the improvement comprising stop means in the form of a flat washer of predetermined thickness secured to said arbor for limiting displacement of said expansible jaws; and a draw bar having a limited predetermined displacement, co-axial with said hollow arbor and said collet for expansion of said jaws.

2. In a collet chuck adapter for use with a self centering, expansible collet chuck on a rotating machine and having a cylindrical, generally hollow arbor; a resilient collet chuck with a plurality of slots in each end thereof, separated by a land area on the inside diameter thereof; said collet positioned on said arbor over a draw bar having an enlarged tapered end; the improvement comprising means on said arbor for causing and limiting the expansion of one end of said expansible collet; a flat washer intermediate the end of said cylindrical arbor and the enlarged end of said draw bar, contact of said enlarged end of said draw bar with said flat washer limiting the travel of said draw bar, so as to limit expansion of said resilient collet on the opposite end thereof.

3. In a collet chuck adapter for use with a self centering expansible collet chuck on a rotating machine and having a cylindrical arbor; a tapered portion on said arbor and spaced from the end thereof; a resilient collet chuck positioned on said arbor in co-axial relationship therewith; a draw bar with an enlarged tapered end extending through said arbor and collet chuck; the improvement of a slot located in said arbor at right angles to the rotational axis thereof and adapted to receive an arcuate key; said arcuate key engaging an undercut section on said expansible collet chuck, said key restricting the movement of said collet when the draw bar is operated.

4. In an arbor for use with an expansible resilient collet chuck and having a cylindrical arbor; a hollow, cylindrical resilient collet chuck with a plurality of substantially equal depth slots therein forming expansible jaws; a land intermediate the ends of said collet chuck and on the inside diameter thereof; tapered surfaces on the inside and outside diameter of each end thereof; said cylindrical collet chuck positioned on the outside diameter of said arbor and piloted on the land intermediate the ends thereof; the improvement comprising stop means on said arbor for limiting displacement of said jaws; and a draw bar having limited displacement co-axial with said arbor and said collet chuck for expansion of said collet chuck jaws so as to hold the inside diameter of a work piece.

5. In a collet chuck adapter for use with a self centering expansible collet chuck on a rotating machine having a cylindrical and hollow arbor; a resilient collet chuck having a plurality of slots in each end thereof and separated by a land area on the inside diameter thereof; and said collet chuck positioned over said arbor; the improvement comprising a draw bar having an enlarged and flexible tapered end, the body thereof extending through said arbor and said collet chuck; a key on said arbor cooperable with one of said slots so as to prevent rotation of said collet with respect to said arbor; a flat washer intermediate the end of said arbor and the enlarged end of said draw bar, contact of said enlarged end of said draw bar with said flat washer limiting the expansion of said resilient collet on the opposite end thereof.

6. In a collet chuck adapter for use with a self centering collet chuck on a rotating machine and having a generally cylindrical hollow arbor; a resilient collet chuck positioned thereon and co-axial therewith; the improvement of a draw bar having an enlarged and flexible end, extending through said arbor and said resilient collet chuck; a slot in said arbor adapted to receive a key; said key retaining said expansible collet chuck on said arbor so as to limit the axial displacement thereof.

7. In a collet chuck having a generally hollow arbor; a resilient collet positioned over said arbor and co-axial therewith; a draw bar extending through said hollow arbor and said collet; an enlarged hollow end on said draw bar; tapered ends on said chuck cooperable with tapered portions on said arbor and the enlarged end of said draw bar; the improvement of a slot in the periphery of said arbor and at right angles to the axis thereof, said slot adapted to receive a flat key; said key retaining said expansible collet on said arbor so as to limit the displacement thereof when said draw bar is operated to expand said chuck.

References Cited in the file of this patent

UNITED STATES PATENTS

| | | |
|---|---|---|
| 2,739,818 | Benjamin | Mar. 27, 1956 |
| 2,877,022 | Parker | Mar. 10, 1959 |
| 2,928,680 | Sattler | Mar. 15, 1960 |
| 2,970,842 | Drew | Feb. 7, 1961 |